June 30, 1953
E. L. SCHLAGE ET AL
2,643,687
STRAP FASTENING TOOL
Filed Nov. 14, 1945
3 Sheets-Sheet 1
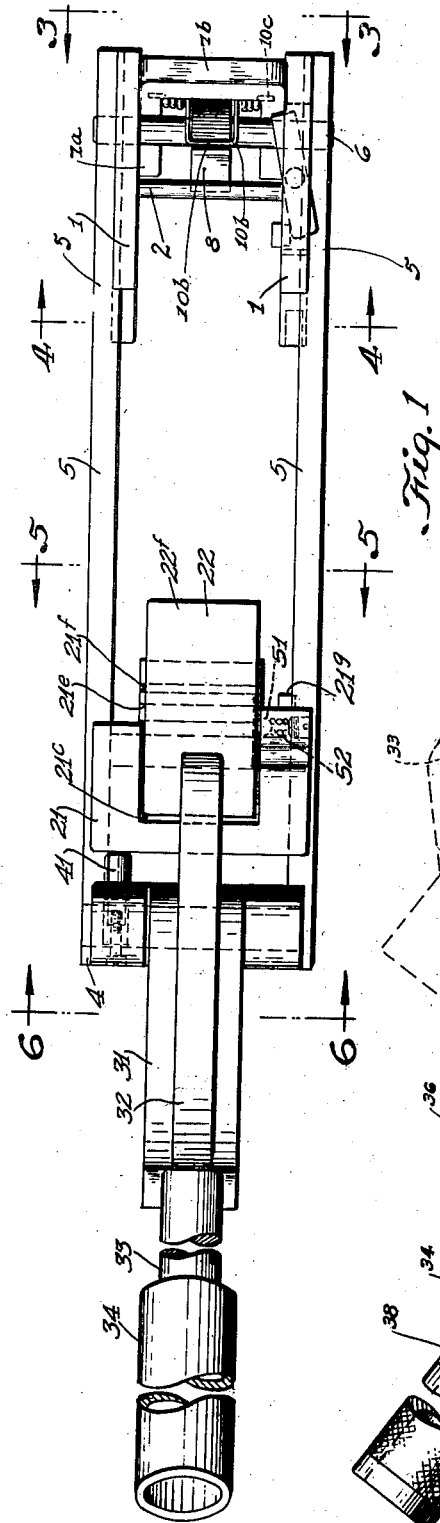
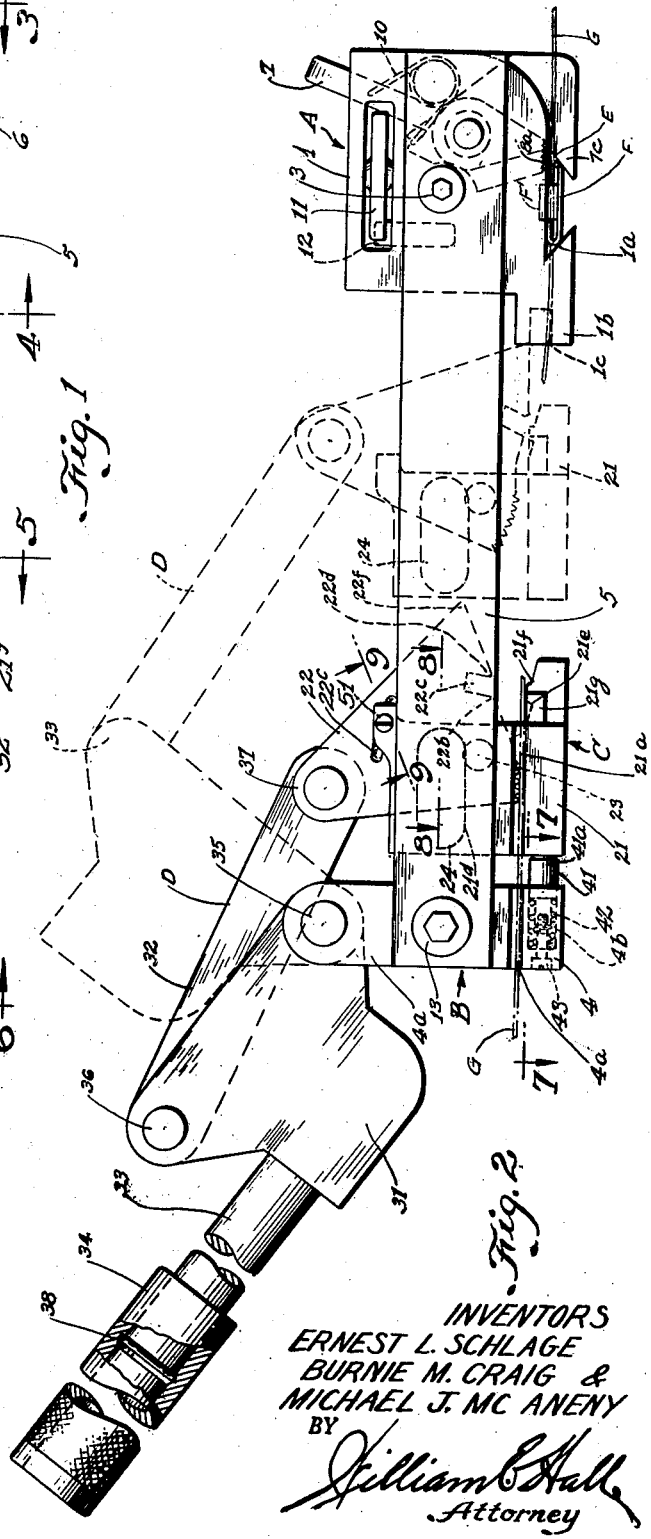
INVENTORS
ERNEST L. SCHLAGE
BURNIE M. CRAIG &
MICHAEL J. MC ANENY
BY
William B Hall
Attorney June 30, 1953  E. L. SCHLAGE ET AL  2,643,687
STRAP FASTENING TOOL
Filed Nov. 14, 1945  3 Sheets-Sheet 2

INVENTORS
ERNEST L. SCHLAGE
BURNIE M. CRAIG &
MICHAEL J. MCANENY
BY
William C. Hall
Attorney June 30, 1953  E. L. SCHLAGE ET AL  2,643,687
STRAP FASTENING TOOL
Filed Nov. 14, 1945  3 Sheets-Sheet 3

INVENTORS
ERNEST L. SCHLAGE
BURNIE M. CRAIG &
MICHAEL J. MC ANENY

BY William B. Hall
Attorney

Patented June 30, 1953

2,643,687

UNITED STATES PATENT OFFICE 2,643,687

STRAP FASTENING TOOL

Ernest L. Schlage, Burlingame, Burnie M. Craig, Pasadena, and Michael J. McAneny, Los Angeles, Calif.; said Schlage and said Craig assignors to said McAneny Application November 14, 1945, Serial No. 628,442

12 Claims. (Cl. 140—93.4)

Our present invention relates to a strap fastening tool for securing together the opposite ends of a metal or other band or strap.

One of the principal objects of this invention is to provide a tool of this class whereby the opposite ends of a strap may be tightly drawn together around an object to be embraced or bound thereby, the strap cut to desired length, and the ends secured together by a strap receiving buckle.

Another important object of this invention is to provide a tool of this class whereby the various operations mentioned may be performed by a substantially continuous, repeated and uniform operation of the tool.

An important object also of this invention is to provide a tool of this class whereby such operations are performed with respect to a buckle which performs the office of securing the ends of the strap together.

An important object of this invention is the provision, in a tool of this class, of a single member which clamps, tightens, cuts to length, and forms an untensioned end of the strap, and further such a member which also folds the formed untensioned end into a buckle and flattens, compresses or irons the buckle after such folding of the latter end of the strap thereinto.

An important feature of this invention is the provision of a resilient stop for the retraction of the slide, employed for tightening the strap in a tool as herein constructed, and to cause initial movement or return of the slide toward the head end, such construction permitting relatively rapid operation of the strap tightening means at the end of the tightening operation requiring the greatest force.

Another important novel feature of this invention is the provision of simple friction means in association with the main frame and the pawl carrier slidably mounted thereon, whereby the strap-gripping pawl is caused to be shifted into and out of the strap-gripping position before the slide is moved by the same means which causes shifting of said pawl.

Still another important and novel feature of this invention is the provision of means whereby the strap-gripping pawl is substantially prevented from being shifted beyond its normal strap-release position until the slide is shifted beyond a predetermined position and engages a positive stop, thereby bringing into operative position a means, in connection with or as a part of the pawl, a cutter for cutting off the excess or extended portion of the strap, the cutting operation being effected by the same means operating the pawl.

A further important object of this invention is the provision of a tool of relatively light construction and in which the several parts are so interlocked that they support or reinforce each other when the greatest strain is required to cut and bend the strap.

A still further important object of this invention is the provision of a novel jaw means for clamping or securing the buckle to the head, and novel means in connection therewith for temporarily holding the contractable end of the strap therein, and further novel means for operating both or shifting the same into operative position to perform their respective functions.

Still another object of this invention is to provide a novel operating lever for a tool of this class, which may be readily extended and contracted, readily held in such positions, and which is durable.

With these and other objects in view, as will appear hereinafter, we have devised a strap fastening tool having certain novel features of construction, combination, and arrangement of parts and portions, as will be hereinafter described in detail and particularly set forth in the appended claims, reference being had to the accompanying drawings and to the characters of reference thereon, which form a part of this application, in which:

Fig. 1 is a fragmentary side elevational view of our tool in a preferred form, showing the same in position to clamp a buckle and draw one end of a strap with respect thereto, and showing by dotted lines, various elements of our tool in various shifted positions;

Fig. 2 is a fragmentary top view thereof;

Figure 3:
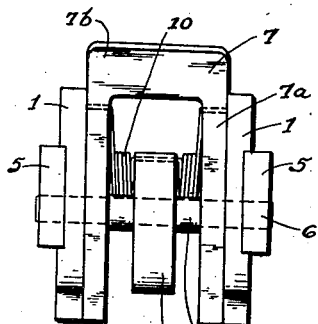
Fig. 3 is an end elevational view thereof, taken from the front end, the view being taken at 3—3 of Fig. 1.
Figure 4:
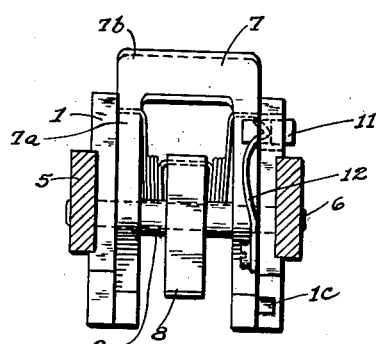
Fig. 4 is a transverse sectional view, taken through 4—4 of Fig. 1, showing the rear side of the front head.
Figure 5:
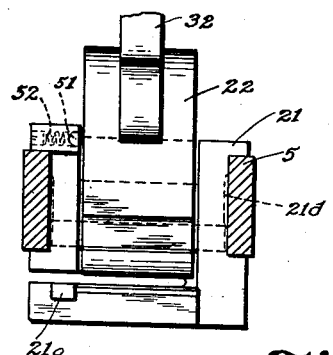
Fig. 5 is a transverse sectional view thereof, taken through 5—5 of Fig. 1, showing the forward end of the slide and the strap cutting and forming member.
Figure 6:
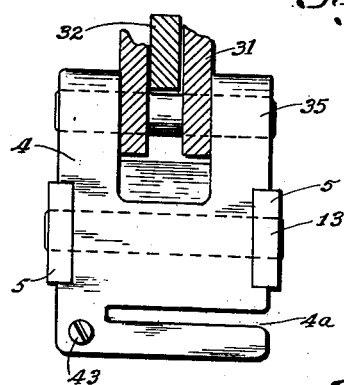
Fig. 6 is a partial rear end elevational and partial sectional view, taken at 6—6 of Fig. 1.
Figure 7:
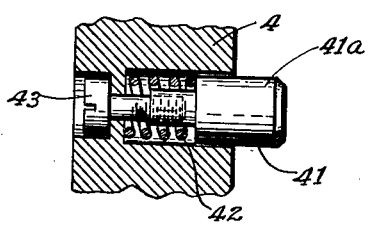
Fig. 7 is a fragmentary sectional view, taken through 7—7 of Fig. 2, showing the slide limiting means at the rear end of the tool.
Figure 8:
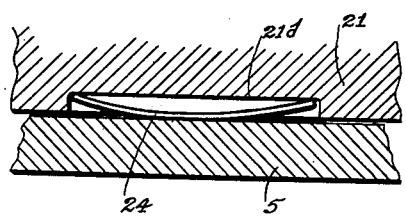
Fig. 8 is a fragmentary sectional view, taken through 8—8 of Fig. 2, showing the friction creating means between the frame and the slide.
Figure 9:
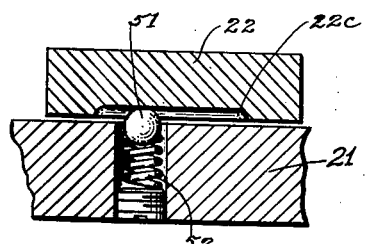
Fig. 9 is a fragmentary sectional view, taken through 9—9 of Fig. 2, showing the means for yieldably checking the rotation of the combined pawl cutter and forming member of our tool.

Our strap fastening tool, as illustrated in the drawings, consists of a forward head A, a rear head B, a slide C, and an operating means D. The forward head A may be referred to as a combined buckle clamp and strap holder, and the slide may be referred to as a combined strap tightener, strap cutting and forming member, and strap threading and buckle compressing means.

The frame or supporting means of the forward head comprises a pair of spaced apart plates or head members 1, which are secured in spaced-apart relation by a spacer 2 and cap screws 3. The forward head is secured to the main member 4 of the rear head B by two long laterally spaced guide rails 5. The cap screws 3 extend through and also secure the forward ends of the rails 5 to the outer sides of the plates or head members 1, these cap screws 3 extending through the head members 1 into the opposite ends of the spacer 2. The head members 1 and guide rails are further held in alignment by a shaft 6.

Between the plates or head members 1 is positioned the movable jaw member 7, which is of U-shape construction, the legs $7^a$ of this jaw being slidably positioned against the inner or adjacent sides of the head members 1. These legs are pivotably mounted to rock on the pin or shaft 6, the cross portion or bridge $7^b$ of the member 7 extending above the upper edges of the head members 1 and providing a handle for rocking the jaw member about the pin or shaft 6. The lower or free ends of the jaw member 7 have at their rear sides inclined jaw portions $7^c$, which are positioned forwardly of and spaced from symmetrical or oppositely inclined jaw portions $1^a$ at the lower ends of the head members 1. The jaw portions $1^a$ and $7^c$ provide dovetail recesses E at the opposite sides of the tool for receiving the ends of the buckle F. The buckle is positioned in such space and is clamped at its edges between such jaw portions when the movable jaw portions $7^c$ are moved backwardly with respect to the stationary jaw portion $1^a$.

Between the legs or furcations of the movable jaw member 7 is located a pawl 8, the same being pivotally mounted intermediate its ends on the pin 6. It is axially located thereon by means of spacers 9 mounted on the pin 6 at the opposite sides of the pawl. This pawl is provided at its lower end with a knurled portion or transverse serrations $8^a$ for removably clamping the band or strap G against the buckle F.

Figure 10:
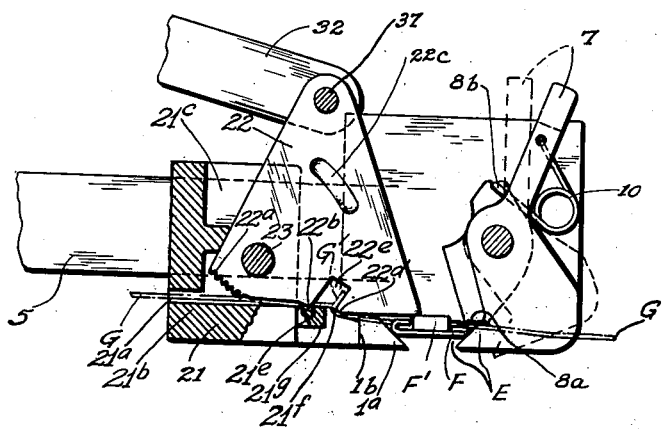
Fig. 10 is a sectional elevational view of our tool, showing the same in a strap cutting position, portions being broken away and in section to facilitate the illustration.
Figure 11:
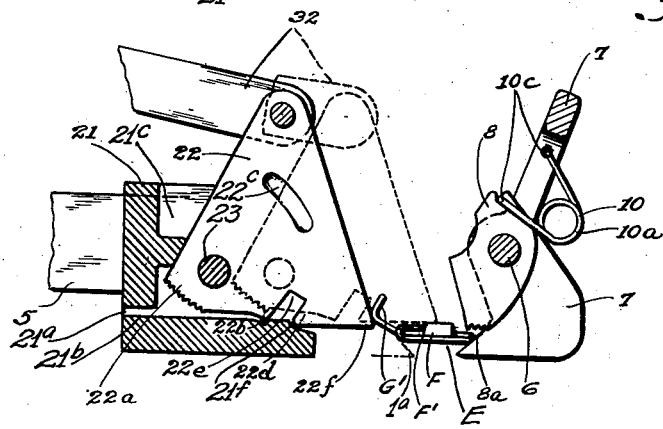
Fig. 11 is a fragmentary elevational view, similar to the head end thereof shown in Fig. 10, but showing the tool in a position to fold the formed end of the strap into the buckle; and, Fig. 12 is a fragmentary longitudinal section of the operating lever in an extended position, showing by dotted lines the handle in contracted position with respect to the handle bar.
Figure 12:
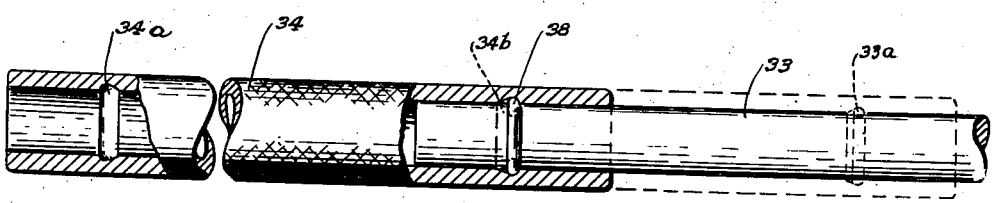

The movable jaw portions $7^c$ are yieldably held against the forward side of the buckle, and the knurled portion $8^a$ is yieldably held against the upper side of the strap G by means of a unitary spring 10, which is a floating spring, i. e., it is not secured to or located by any fixed member of the tool. This spring member has two coiled spring portions $10^a$, which are located between the pawl 8 and the legs $7^a$ of the movable jaw member. The spring portions are connected by a loop $10^b$, which is positioned within a slot $8^b$ at substantially the diametrically opposite end of the pawl. The outer ends of the coiled portions $10^a$ have fingers $10^c$ with right angle bent ends, which are normally located in line with the outer end of the loop $10^b$. These bent ends $10^c$ of the spring extend into holes in the ends of the legs $7^a$ of the jaw member near the cross portion $7^b$, as shown best in Fig. 3. Such construction permits mounting of the spring, as shown in Figs. 1, 10, and 11, for normally holding the movable jaw member 7 and the pawl 8 in their solid line positions, shown in these figures of the drawing. When the handle portion or bridge is drawn backwardly, as shown by dotted lines in Figs. 1 and 10, the mounting of the loop portion $10^b$ of the spring passes the center line connecting the ends of the bent fingers $10^c$ and the axis of the pin 6, holding the jaw portion $7^c$ and the knurled portion $8^a$ in their opposite extreme positions to permit the buckle F and the strap G to be located at the forward end of the tool, or for removing such elements therefrom.

The movable jaw 7 is locked in its buckle-clamping position by a latch 11 which may be in the form of a lever pivoted intermediate its ends on one of the plates 1. One end is resiliently held behind one of the legs $7^a$ by a spring 12. The other end of the latch lever normally extends to the outer side of said plate 1 so that it may be readily depressed with the finger against the spring 12 to permit the handle or cross portion $7^b$ to be drawn backwardly for opening the jaw and releasing the buckle.

The rear ends of the guide rails 5 are secured to the opposite sides of the member 4 of the rear head B, and are secured thereto by cap screws 13.

On and between the guide rails 5, and between the forward and rear heads is slidably mounted a slide 21. This slide has a transverse slot $21^a$ at its lower portion, i. e., below the guide rails, through which the strap G is adapted to be threaded for tightening the same with respect to the buckle. Similarly the member 4 of the rear head is provided with a slot $4^a$ through which such strap may extend to the rear end of the tool.

The portion of the slide 21 above the lateral slot $21^a$, and that portion directly mounted on the guide rails, is of U-shape, as shown best in Fig. 1. The open portion of this U-shape of the slide extends forwardly, and in the open space $21^c$ is located a pivotally mounted rocker or combination tool member 22 so designed and constructed as to provide strap engaging and tightening means, strap cutting and strap end forming means, and means for threading the strap end into a buckle and ironing or pressing the strap end into conforming engagement with the buckle. The several functions of the single member, and the new results obtained thereby during normal manipulation of the tool flow from the novel structural characteristics of the member and its association in the machine. The member 22 is pivotally supported at its lower portion thereon by means of a pin 23, and it is manually rocked thereon by means hereinafter to be described, the operative connection with the rocking member 22 being at its upper end, i. e., with the portion or end extending above the slide.

At the lower end of the rocking member 22 is a knurled or a transversely serrated portion 22$^a$, which, when the upper end of the rocking member is drawn backwardly, grips the upper side of the strap G and clamps the same against a flat ledge or anvil 21$^b$ forming the lower side of the slot 21$^a$. In this respect the rocking member 22 serves as a pawl.

At the opposite sides of the slide 21 are recesses 21$^d$ in which are located elongated, bent plate springs 24. The intermediate portion of the springs are urged outwardly against the inner sides of the guide rails in order to produce sufficient friction to prevent free reciprocation or movement of the slide, and thus cause the rocking of the pawl or rocking member 22 before the slide 21 is moved. In this manner, forward force applied to the upper end of the rocking member 22 will cause the same to be pivoted about its axis, release the grip on the strap, and allow the slide to be shifted forwardly. In a similar manner, backward force applied to the upper end of the rocking member will cause the serrated pawl portion 22$^a$ to grip the strap for another bite, and continued backward force will draw the slide backwardly, drawing with it the strap through the buckle, the pawl 8 allowing the strap to be drawn in this manner.

The slide 21 and the rocker, or rocking member 22, mounted thereon, are shifted or operated by a manual means D, which consists essentially of a yoke 31, link 32, handle bar 33, and a handle 34. The yoke is pivotally connected by means of a pin 35 to and between upwardly extending lugs 4$^a$ of the rear head member 4. The opposite end of the yoke is pivotally connected by a pin 36 to one end of the link 32. The opposite end of the link is connected by means of a pin 37 to the upper end of the rocker 22. The handle bar 33 is round and is secured at one end to the yoke 31 near said opposite end, but outwardly from and parallel to the line connecting the pivot pins 35 and 36. The handle 34 is tubular, and is telescopically mounted over the handle bar 33. Near the outer end of the handle bar is a deep annular groove 33$^a$ in which is loosely fitted a contractable spring ring 38. Within the walls of the bore of the handle 34, and near the opposite ends thereof, are provided annular grooves 34$^a$ and 34$^b$ into either of which the ring 38 is adapted to extend. The portions of the grooves 34$^a$ and 34$^b$, nearest the ends of the handle are round, while the opposite sides or inner portions of the grooves are tapered or inclined towards the intermediate portion of the handle. Thus, when the spring ring 38 is positioned in either groove 34$^a$ or 34$^b$, the handle may be readily shifted in one direction, thereby contracting the ring within the groove 33$^a$ of the handle bar, and allowing the handle to be shifted in the same direction until the spring ring 38 snaps into the other annular groove in the handle. Thus, the handle may be either withdrawn or extended with respect to the handle bar.

Between the rear head member 4 and the slide 21, is a resilient stop 41, which is reciprocally mounted in a recess 4$^b$ in the rear head member. Within the recess is a compression spring 42 against which the head 41$^a$, at the outer end of the stop 41, seats. The stop 41 is retained in an adjusted position by a screw 43, extending into the member 4 from the rear side, in such a manner that the head 41$^a$ may be variously extended beyond the forward face of the rear head member 4.

The purpose of the resilient stop is various. It prevents the otherwise hard impact of the slide against the rear head member 4, when the former is drawn backwardly by the above described manual means. Further, the resilient stop provides means between the slide and the pawl portion of the rocker 22 to cause initial movement or return of the slide toward the head end. This permits relatively rapid operation of the device during the strap-tightening step.

At the lower end of the rocker 22, and forwardly of the knurled or serrated pawl portion 22$^a$, is a shear or cutter portion 22$^b$, which cooperates with a corresponding shear portion or member 21$^e$ on the slide 21 immediately forwardly of the ledge 21$^b$ upon which the strap G is adapted to slide and against which it is adapted to be clamped by the pawl portion 22$^a$. The cutter portion 22$^b$ of the rocker is adapted to co-operate with the shear portion or member 21$^e$ of the slide, in order to shear the strap G when the rocker 22 is rotated in a counterclockwise direction by the manual operating means D, i. e., in a direction opposite to that required to clamp the strap by the pawl portion 22$^a$.

Such counterclockwise rotation of the rocker is effected when the handle 34 is moved forwardly, forcing the slide 21 also to move forwardly. When the forward portion of the slide 21 positively engages rearwardly extended stops 1$^b$, continued forward movement of the handle 34 of the operating means D, causes the rocker 22 to continue its counterclockwise rotation about the pivot pin 23 to shear the strap. In order to prevent such shearing or cutting of the strap and the extreme rotation of the rocker until the slide 21 engages the stops 1$^b$, we have provided a resilient latch in the form of a ball 51 at the forward and upper portion of the slide 21. This ball is forced by a spring 52 toward the recess or space 21$^c$ in which the rocker 22 is mounted. The rocker is provided at the side adjacent the ball with an arcuate slot 22$^c$ in which the ball 51 is normally seated. The ball is normally prevented from ejection from the groove 22 by the shoulder formed at the rear end of the arcuate groove 22$^c$, but when the slide positively engages the stops 1$^b$ of the forward head, slight additional force on the handle of the manual means D will permit such ball to be ejected and permit the cutting portion 22$^b$ to be forced downwardly to shear the strap to leave an untensioned end of the strap for forming and bending over the upper side of buckle F with the strap end inserted underneath the transverse strap or band F' of the buckle.

Immediately forward of the shearing means just described, there is provided a forming means for bending the sheared end of the strap upwardly, as indicated by G$^1$ and by solid lines in Fig. 11 and by dotted lines in Fig. 10. This forming means consists of a die portion 21$^d$ forwardly of the cutting portion 22$^b$, and it cooperates with a die portion 21$^f$ immediately forwardly of the shear portion 21$^e$. Between the cutting portion 22$^b$ and the die portion 22$^d$, there is provided a transverse slot 22$^e$ for receiving the cut or sheared end of the strap when it is bent upwardly by the die means. The relation between the die portions 22$^d$ and 21$^f$ is such that they begin the upward bending of the rear end of the strap after it has been cut or sheared.

After the strap has thus been cut and formed, the bent end of the strap is in condition to be folded into or under a transverse bridged portion or band $F^1$ at the upper side of the buckle F. In order to effect such result, the slide and rocker are drawn backwardly until the forward end $22^f$ of the rocker is positioned behind the upwardly bent portion $G^1$ of the strap. The rocker and slide are then moved forwardly, which causes the extreme lower and forward end of the rocker $22^f$, which is of acute angular shape, to engage the strap below the bent portion $G^1$, bend the same upwardly, and insert the extreme end of the bent portion of the strap below the band $F^1$ of the buckle. Continued forward movement of the rocker will force this portion of the strap below the band $F^1$, press or iron out the bend $G^1$ formerly made, and also compress the band $F^1$ over the end of the strap. Thus, the sheared or cut end of the strap is secured, by means of a buckle, to the other end of the strap.

Considerable force is required to shear the strap and to bend the same upwardly. In order to reinforce the forward end of the slide provided with the shear and die portions $21^e$ and $21^f$, the lateral portions $21^g$ of such forwardly extending portion, is adapted to enter recesses $1^c$ at the upper portions of the stops $1^b$, providing shoulders at the bottom of such recesses against which the laterally extended portions $21^g$ of the slide seat when such great force is applied against the shear and die portions above mentioned.

The operation of the device is explained briefly as follows: When a metal or other strap or band G is to be bound around an object, one end of the strap (not shown), to which a buckle F is attached, is located in the device with the buckle disposed as shown in Fig. 2. This is accomplished by first opening the jaw $7^c$ to permit the buckle F to be inserted between the jaws $7^c$ and $1^a$, the jaw $7^c$ being opened by swinging the member 7 in a counterclockwise direction. Such movement acts through the spring 10 to swing the pawl member 8 in the opposite direction to raise its lower knurled portion $8^a$. After the buckle F has been positioned, as shown in Fig. 1, the jaw member 7 is pivoted in reverse direction so as to cause its jaw end $7^c$ to clamp the buckle against the fixed jaw $1^a$. Such movement causes the spring 10 to simultaneously shift the pawl 7 in a direction to move its end $8^a$ toward the buckle. The other end of the strap G (shown in the drawings) is threaded through the buckle F and thus as the pawl end $8^a$ moves down it clamps this end against the buckle with a force capable of resisting movement of the strap forwardly out of the buckle while permitting rearward movement of the strap to draw the entire strap snugly around the object.

After the strap ends and buckle have thus been positioned, the handle 34 is swung forwardly to cause the pawl end $22^a$ of the rocking member 22 to be elevated above the strap G and the slide 21 to move forwardly to any suitable distance as determined by the extent of movement of the handle. When the pivotal movement of the handle 34 is reversed the pawl end $22^a$ grips the strap against the ledge $21^b$ and the slide 21 is shifted rearwardly to draw the strap end G through the buckle F, the pawl 8 yielding to permit this movement but checking reverse movement of the strap when the strap is again released by the pawl end $22^a$. It is apparent, therefore, that by reciprocating the slide 21 in this manner, the strap end G is drawn tightly around the object and through the buckle F. When the slide is subsequently moved forwardly, the pawl end $22^a$ is released from the strap end G and rides thereover. As the slide 21 approaches the limit of its forward movement, its forward end encounters the fixed shoulder $1^a$ to arrest such motion, and further pivotal movement of the handle 34 causes the rocking member 22 to swing in counterclockwise direction on its pivot 23 so as to effect a shearing action between the cutting edges $22^b$ and $21^e$ to sever the strap end G. At the same time the cut end of the strap will be bent upwardly, as indicated at $G^1$ in Fig. 10, by the cam surfaces $21^f$ and $22^d$. After the strap end has been cut off and formed, the slide 21, together with the rocking member 22, is moved rearwardly by means of the handle 34 and link 32 until the forward pointed end $22^f$ of the rocking member is disposed rearwardly of the bent end $G^1$ of the strap G, after which the slide is again advanced to cause the pointed end $22^f$ to fold the end $G^1$ over and under the bridge portion $F^1$ of the buckle. Continued advancement of the slide 21 causes the pointed end $22^f$ to slide across and depress the bridge portion $F^1$ to securely fasten the two ends of the strap together with the strap snugly looped around the object. At the completion of the fastening operation the handle 34 is drawn rearwardly, as shown by full lines in Fig. 2, so as to return the parts to the original position in readiness to perform another fastening operation. To release the strap G and buckle F, the jaw member is swung to the dotted line position, indicated in Fig. 10, so as to widen the dovetail opening E, and at the same time the pawl end $8^a$ is swung upwardly to permit another strap and buckle to be subsequently inserted in the device.

Though we have shown and described a particular construction, combination, and arrangement of parts and portions, we do not wish to be limited to the same, but desire to include in the scope of our invention the construction, combination, and arrangement substantially as set forth in the appended claims.

We claim:

1. In a strap fastening tool for fastening a strap to a buckle, a frame having a head at one end including relatively movable clamping members for securing the buckle, there being a passage through the head for receiving an end of the strap to be fastened to the buckle, a slide mounted on the frame and provided with a ledge, a rocker pivotally mounted on the slide and provided with a pawl portion at one side of the rocker pivot for clamping the strap against the ledge, and means for tilting the rocker about its pivotal axis on the slide, the slide and the rocker having co-operating shear portions on the opposite side of the rocker pivot for shearing the strap when the rocker is moved in a direction opposite to the strap-holding action of the pawl.

2. In a strap fastening tool for fastening a strap to a buckle, a frame having a head at one end including relatively movable clamping members for securing the buckle, there being a passage through the head for receiving an end of the strap to be fastened to the buckle, a slide mounted on the frame and having a ledge, a rocker pivotally mounted on the slide and provided with a pawl at one side of the rocker pivot for clamping the strap against the ledge, and means for tilting the rocker about its pivotal axis on the slide, the slide and the rocker having co-operating shear portions on the opposite side of the rocker pivot for shearing the strap upon movement of the rocker relative to said slide in a direction opposite to the strap-holding action of the pawl, the slide and the rocker having also co-operating portions forming die means spaced respectively from said ledge and pawl for bending the end of the strap, after it is sheared, by continuous movement of the rocker about its pivotal axis.

3. In a strap fastening tool for fastening a strap to a buckle, a frame having a head at one end with means for securing the buckle and for receiving an end of the strap to be fastened to the buckle, a slide mounted on the frame, a member pivotally mounted on the slide and provided at one side of the member pivot with a pawl portion on one side of the member pivot for co-operation with a portion of the slide for securing the strap to the slide, and means for rocking said member about its pivotal axis on the slide, the slide and said member having co-operating shear members on the other side of the member pivot for severing the strap when the member is rocked in a direction opposite to the strap holding action of the pawl, the slide and the member having also co-operating forming die means for bending the ends of the strap after it is cut, by continuous rotation of the member about its pivotal axis, the member having a folding end portion at the end nearest the head for folding the bent portion of the strap over and into the buckle, said forming end of the member having also a portion for compressing the buckle over the bent end of the strap.

4. In a tool of the class described, a frame, a slide reciprocally mounted thereon in a longitudinal direction, a rocker pivotally mounted on the slide on an axis transverse to the longitudinal movement thereof, the lower end of the rocker having a knurled pawl portion adapted to clamp a strap against a cooperating portion of the top surface of a ledge at the lower portion of the slide when the rocker is pivoted in one direction, operating means connected to the upper end of the rocker and to the frame for rotating the rocker about its axis to move the pawl portion toward the ledge and for drawing the slide backwardly, the lower end of the rocker having a cutter portion positioned forwardly of its pivotal axis and co-operating with a shear portion at the forward portion of the slide for shearing the strap.

5. In a tool of the class described, a frame, a slide reciprocally mounted thereon in a longitudinal direction, a rocker pivotally mounted on the slide on an axis transverse to the longitudinal movement thereof, the lower end of the rocker having a knurled pawl portion adapted to clamp a strap against the top surface of a ledge at the lower portion of the slide when the rocker is pivoted in one direction, operating means connected to the upper end of the rocker and to the frame for rotating the rocker about its axis to move the pawl portion toward the ledge and for thereafter drawing the slide backwardly, the lower end of the rocker having a cutter portion positioned forwardly of its pivotal axis and co-operating with a shear portion at the forward portion of the slide for shearing the strap when the rocker is pivoted in reverse direction, the lower end of the rocker also having a die portion in front of the cutter portion co-operating with a die portion on the slide in front of the shear member for bending upwardly the sheared end of the strap during said reverse pivotal movement.

6. In a tool of the class described, a frame having a head at its rear end, a slide reciprocally mounted on the frame for movement in a longitudinal direction, a rocker pivotally mounted on the slide on an axis transverse to the longitudinal movement thereof, the lower end of the rocker having a knurled pawl portion adapted to clamp a strap against the top surface of a ledge portion at the lower portion of the slide, operating means connected to the upper end of the rocker and pivotally connected to the head at the rear end of the frame for rotating the rocker about its axis in a direction to move the pawl portion toward the ledge and for thereafter drawing the slide backwardly, a resilient stop between the rear head and the slide, means on said slide and said rocker for severing the strap, and means on said rocker for bending the severed end of the strap.

7. In a tool of the class described, a frame, a head member at the front end of the frame having gripping means for a buckle having fastened thereto one end of a strap, a slide reciprocally mounted on the frame for movement in a longitudinal direction, a rocker pivotally mounted on the slide on an axis transverse to the longitudinal movement thereof, the lower end of the rocker having a knurled pawl portion adapted to clamp the other end of the strap against the slide, operating means connected to the upper end of the rocker and to the frame for rotating the rocker about its axis and for thereafter drawing the slide backwardly, the lower end of the rocker having a cutter portion positioned forwardly of its pivotal axis and co-operating with a shear portion of the slide for shearing the strap, the lower end of the rocker also having a die portion in front of the cutter portion co-operating with a die portion on the slide for bending upwardly the sheared end of the strap, and resilient means in association with the slide and the rocker for resisting the co-operation of the cutter portion with the shear portion until the slide is shifted into engagement with the head member.

8. In a strap fastening tool for fastening a strap to a buckle, a frame having a head at one end having relatively movable holding members for securing the buckle and a passage for receiving an end of the strap to be fastened to the buckle, a slide mounted to slide longitudinally on the frame, means pivoted on the slide and having a strap engaging portion on the lower side thereof angularly movable to a position with respect to the slide for clamping the strap thereto when the slide is drawn from the head; said means having a cutter portion on the lower side thereof cooperating with a fixed shearing portion on the slide for cutting the strap when the slide and means are moved toward the head and said means is angularly moved to another position with respect to the slide, and means including a lever for operating the slide to and from the head and the pivoted means in its angular movement.

9. In a strap fastening tool for fastening a strap to a buckle, a frame having a head at one end having relatively movable clamping members for securing the buckle and a passage for an end of the strap to be fastened to the buckle, a slide mounted to slide longitudinally on the frame, means pivoted for angular movement on the slide and movable counterclockwise to a position with respect to the slide for clamping the strap thereto when the slide is drawn from the head, said means having a cutter portion cooperating with a shearing portion on the slide for cutting the strap and said slide and means having cooperating bending portions for bending the cut strap end when the slide and means are moved toward the head and said means is angularly moved clockwise with respect to the slide to another position, said means having a folding portion for folding the bent end over and into the buckle when the slide is reciprocated and moved toward the head during a second stroke, and means including a lever for operating said slide and pivoted means.

10. In a strap fastening tool of the character described for fastening a strap to a buckle, a frame having a head at one end including relatively movable holding members for securing the buckle and a passage for receiving an end of the strap to be fastened to the buckle, a slide mounted on the frame to slide longitudinally thereof, a member movably mounted on the slide having adjacent strap gripping, strap cutting and strap bending means along one face thereof cooperable with the strap and spaced portions of the slide in relative movement of the slide and member and manipulative movement of the slide and member along the frame, and means for effecting said relative and manipulative movements of the slide and member along the frame to cause said member to grip, cut and bend a strap end.

11. In a strap fastening tool of the character described for fastening a strap to a buckle, a frame having a head at one end including relatively movable holding members for securing the buckle and a passage for receiving an end of the strap to be fastened to the buckle, a slide mounted on the frame to slide longitudinally thereof, a member movably mounted on the slide having a strap gripping portion, a strap cutting portion and a strap bending portion cooperable with gripping, cutting and bending portions on the slide and an anvil portion on the end of said member nearest the head for folding the end of the strap over and into the buckle, said slide and member being relatively movable and slidable along the frame to grip, cut and bend the strap between the slide and member and to fold the severed end of the strap over and into the buckle, and means including a manually operable lever for effecting said relative, sliding, gripping, cutting, bending, and folding movements.

12. In a strap fastening tool for fastening a strap to a buckle; a frame having a head at one end, said head having a fixed jaw; a pin on said head; a movable jaw pivoted on said pin and adapted to be manually pivoted to an operative position adjacent the fixed jaw to clamp a buckle therebetween and to an inoperative position to release the buckle; a pawl pivotally mounted on said pin and adapted to be pivoted to an operative position to grip a strap against the buckle clamped between said jaws and to an inoperative position to release said strap, said movable jaw and said pawl pivoting in opposite directions to operative positions and in opposite directions to inoperative positions; and a spring disposed between said movable jaw and said pawl with effective portions of the spring connected to said jaw and said pawl to be tensioned therebetween upon pivotal movement of said movable jaw to operative and inoperative positions, so as to effect pivotal movement of said pawl to operative and inoperative positions but in directions opposite to said pivotal movement of said movable jaw, said movable jaw being U-shaped to provide spaced legs pivoted on said pin and a cross-portion, said member having a handle projecting from said cross-portion, and said pawl and spring being disposed between said legs.

ERNEST L. SCHLAGE.
BURNIE M. CRAIG.
MICHAEL J. McANENY.

References Cited in the file of this patent

UNITED STATES PATENTS

| Number | Name | Date |
| --- | --- | --- |
| 1,149,994 | De Haven | Aug. 10, 1915 |
| 1,553,110 | Rich | Sept. 8, 1925 |
| 1,752,495 | MacChesney | Apr. 1, 1930 |
| 1,987,293 | Graves | Jan. 8, 1935 |
| 2,036,866 | Frost | Apr. 7, 1936 |
| 2,076,276 | Porter | Apr. 6, 1937 |
| 2,112,585 | Wright | Mar. 29, 1938 |
| 2,324,609 | Watt | July 20, 1943 |
| 2,368,969 | Cleveland | Feb. 6, 1945 |
| 2,382,291 | Carlberg | Aug. 14, 1945 |